United States Patent [19]
Pornaghdi

[11] Patent Number: 6,000,256
[45] Date of Patent: Dec. 14, 1999

[54] AUTOMATIC TRANSMISSION SHIFT LOCK DEVICE

[76] Inventor: Kioumars Pornaghdi, 11839 Tolentino Dr., Alta Loma, Calif. 91701

[21] Appl. No.: 09/106,333

[22] Filed: Jun. 29, 1998

[51] Int. Cl.[6] .................................................. B60R 25/06
[52] U.S. Cl. .............................................. 70/247; 70/202
[58] Field of Search ........................... 70/246, 247, 248, 70/245, 237, 211, 203, 201, 198, 199, 14, 58, 320, 371

[56] References Cited

U.S. PATENT DOCUMENTS

| | | |
|---|---|---|
| 1,362,685 | 12/1920 | Farah .......................................... 70/201 |
| 1,895,404 | 1/1933 | Tretbar ........................................ 70/355 |
| 4,282,769 | 8/1981 | Sandrock ..................................... 70/201 |
| 4,297,914 | 11/1981 | Klem et al. .................................. 70/201 |
| 4,993,248 | 2/1991 | Nordberg ..................................... 70/247 |
| 5,404,733 | 4/1995 | Fitzpatrick .................................. 70/371 |
| 5,555,755 | 9/1996 | Padrin ......................................... 70/247 |
| 5,609,049 | 3/1997 | Rundle et al. ................................ 70/202 |

*Primary Examiner*—Suzanne Dino Barrett

[57] ABSTRACT

An automatic transmission shift lock device is provided including a lower portion dimensioned for positioning within a housing for a shift lever, whereby a cut-out pattern on the lower portion aligns with the shift pattern of the shift lever. Also included is an upper portion dimensioned for engagement with the lower portion for lockable engagement therewith.

1 Claim, 3 Drawing Sheets

AUTOMATIC TRANSMISSION SHIFT LOCK DEVICE

BACKGROUND OF THE INVENTION

1. Field of the Invention

The present invention relates to an automatic transmission shift lock device and more particularly pertains to locking a transmission shift in place to prevent tampering with an automatic transmission shift lock device.

2. Description of the Prior Art

The use of shift lever locks is known in the prior art. More specifically, shift lever locks heretofore devised and utilized for the purpose of locking a shift lever in place are known to consist basically of familiar, expected and obvious structural configurations, notwithstanding the myriad of designs encompassed by the crowded prior art which have been developed for the fulfillment of countless objectives and requirements. By way of example, U.S. Pat. No. 5,181,592 to Pattock discloses a shift lever interlock system.

U.S. Pat. No. 5,329,792 to Lee discloses a concealed car locking device for automatic shift lever.

U.S. Pat. No. Des. 306,253 to Solow discloses the ornamental design for an automobile lock for attachment to a floor-mounted gear shift lever and hand brake.

U.S. Pat. No. 5,361,613 to Fort et al. discloses a vehicle anti-theft device.

In this respect, the automatic transmission shift lock device according to the present invention substantially departs from the conventional concepts and designs of the prior art, and in so doing provides an apparatus primarily developed for the purpose of locking a transmission shift in place to prevent tampering with an automatic transmission shift lock device.

Therefore, it can be appreciated that there exists a continuing need for a new and improved automatic transmission shift lock device which can be used for locking a transmission shift in place to prevent tampering with an automatic transmission shift lock device. In this regard, the present invention substantially fulfills this need.

SUMMARY OF THE INVENTION

In view of the foregoing disadvantages inherent in the known types of shift lever locks now present in the prior art, the present invention provides an improved automatic transmission shift lock device. As such, the general purpose of the present invention, which will be described subsequently in greater detail, is to provide a new and improved automatic transmission shift lock device which has all the advantages of the prior art and none of the disadvantages.

To attain this, the present invention essentially comprises a lower portion having a generally elongated and planar configuration. The lower portion has an outwardly curved forward edge, an inwardly curved rearward edge and two long side edges. The lower portion has a cut-out pattern extending lengthwise through a central portion thereof with an opening formed at the inwardly curved rearward edge. The cut-out pattern corresponds to a shift pattern of a shift lever of an automobile. The lower portion is dimensioned for positioning within indented side portions of a housing for the shift lever whereby the cut-out pattern aligning with the shift pattern of the shift lever. The lower portion has a rectangular slot with a circular central extent adjacent to the opening in the cut-out pattern. Associated with the lower portion is an upper portion. The upper portion has a generally elongated and planar configuration. The lower portion has an outwardly curved forward edge, an inwardly curved rearward edge and two long side edges. A lower surface of the upper portion has a lock mounted thereon. A key slot extends through an upper surface of the upper portion into the lock. The device further includes a key that is adapted for selectively engaging the lock to fix the upper portion with respect to the lower portion for the purpose of precluding movement of the shift lever.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automatic transmission shift lock device which has all the advantages of the prior art shift lever locks and none of the disadvantages.

It is another object of the present invention to provide a new and improved automatic transmission shift lock device which may be easily and efficiently manufactured and marketed.

It is a further object of the present invention to provide a new and improved automatic transmission shift lock device which is of a durable and reliable construction.

An even further object of the present invention is to provide a new and improved automatic transmission shift lock device which is susceptible of a low cost of manufacture with regard to both materials and labor, and which accordingly is then susceptible of low prices of sale to the consuming public, thereby making such automatic transmission shift lock device economically available to the buying public.

Still yet another object of the present invention is to provide a new and improved automatic transmission shift lock device which provides in the apparatuses and methods of the prior art some of the advantages thereof, while simultaneously overcoming some of the disadvantages normally associated therewith.

Still another object of the present invention is to lock a transmission shift in place to prevent tampering with an automatic transmission shift lock device.

Lastly, it is an object of the present invention to provide a new and improved automatic transmission shift lock device including a lower portion dimensioned for positioning within a housing for a shift lever, whereby a cut-out pattern on the lower portion aligns with the shift pattern of the shift lever. Also included is an upper portion dimensioned for engagement with the lower portion for lockable engagement therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
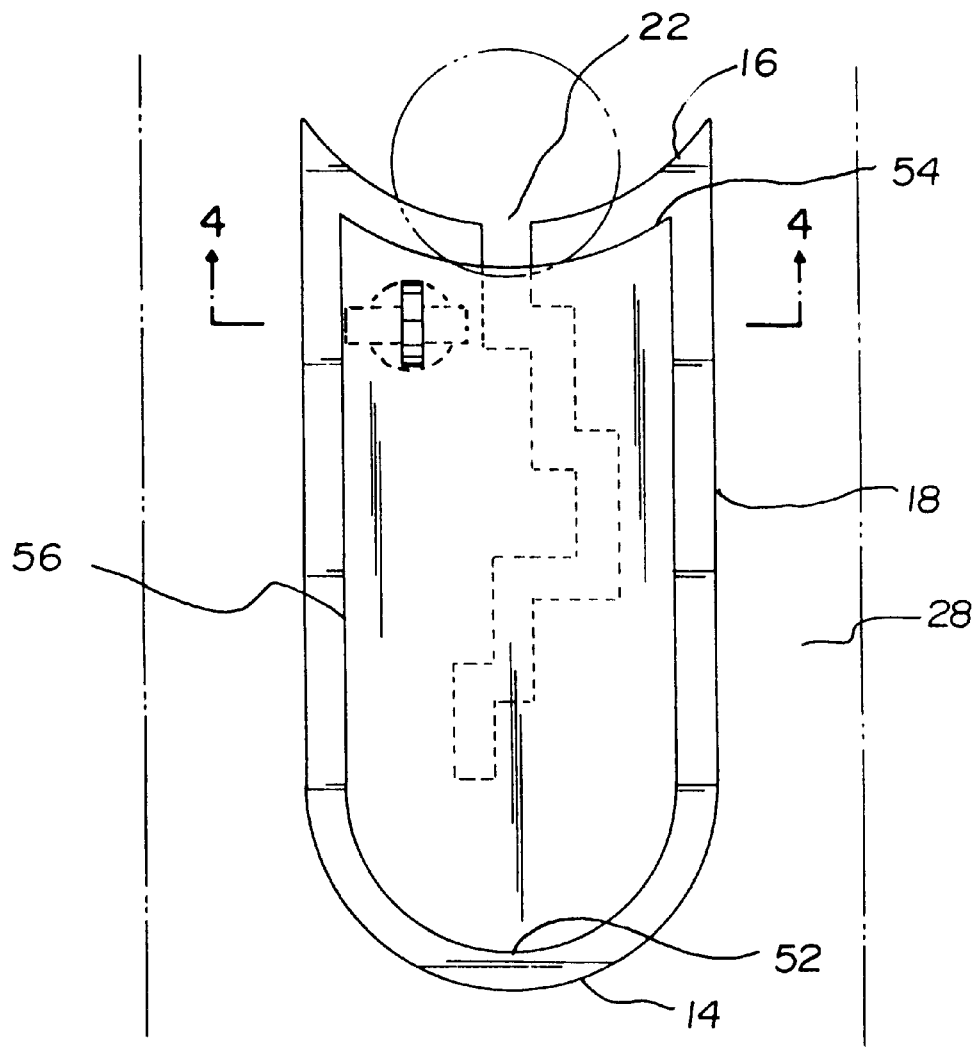
FIG. 1 is a plan view of the present invention shown in a locked orientation with respect to a shift layer of an automobile.
Figure 2:
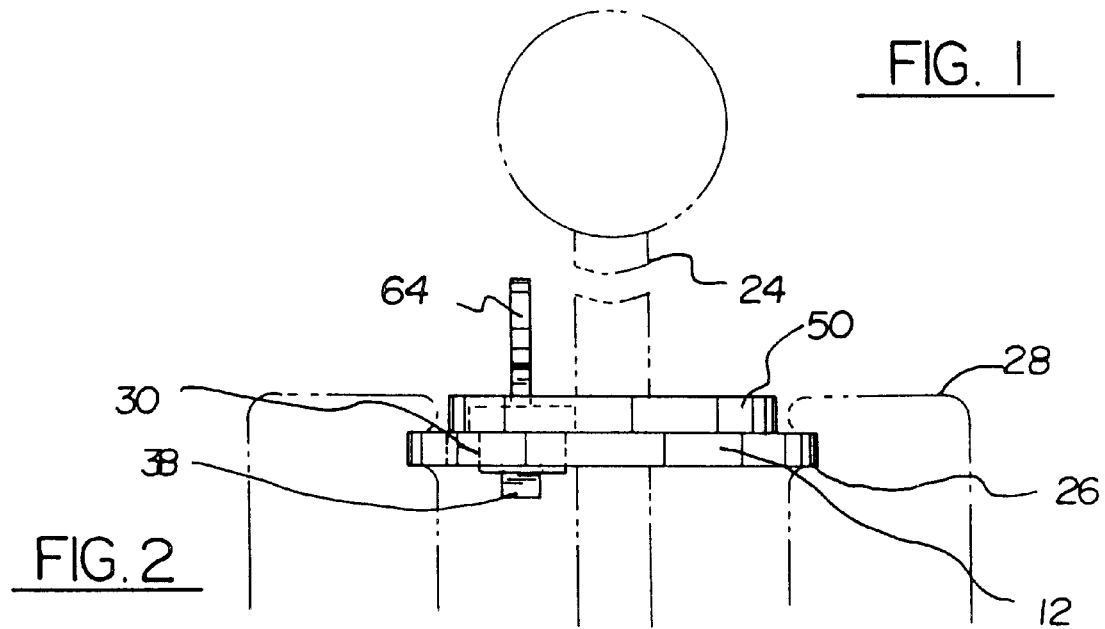
FIG. 2 is a side elevation view of the present invention shown in a locked orientation with respect to a shift lever of an automobile.
Figure 3:
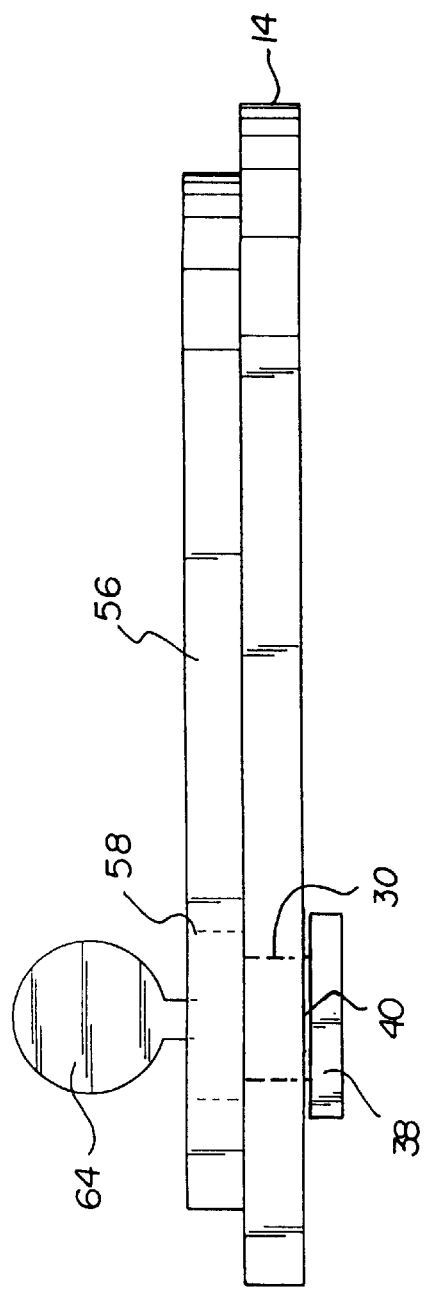
FIG. 3 is side elevation view of the present invention.
Figure 4:
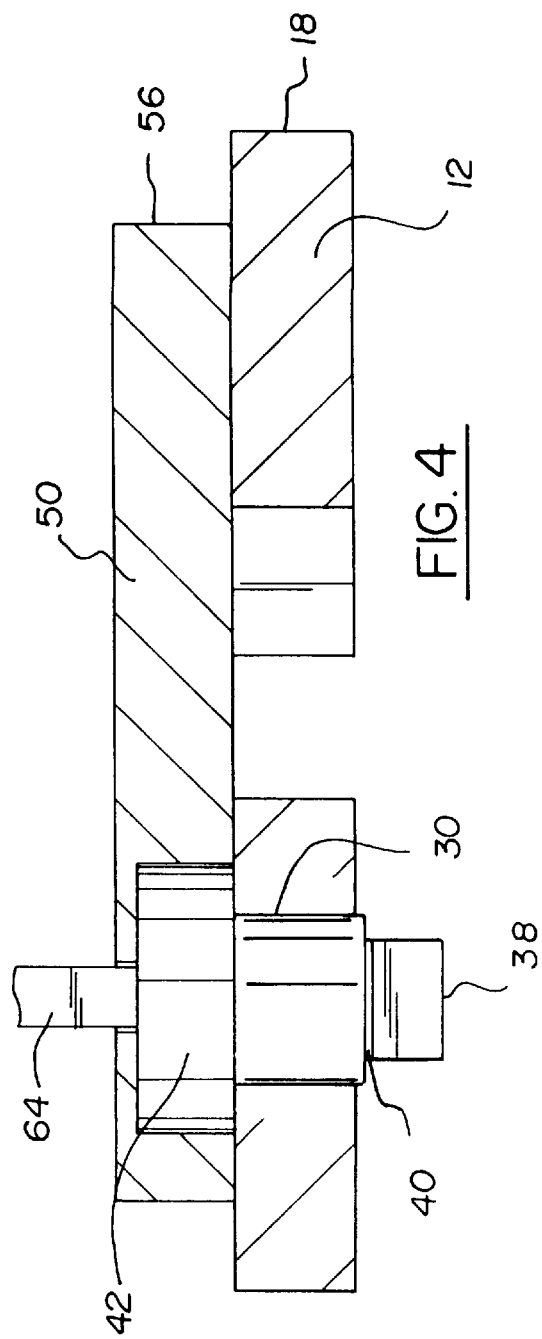
FIG. 4 cross-sectional view as taken along line 4—4 of FIG. 1.
Figure 5:
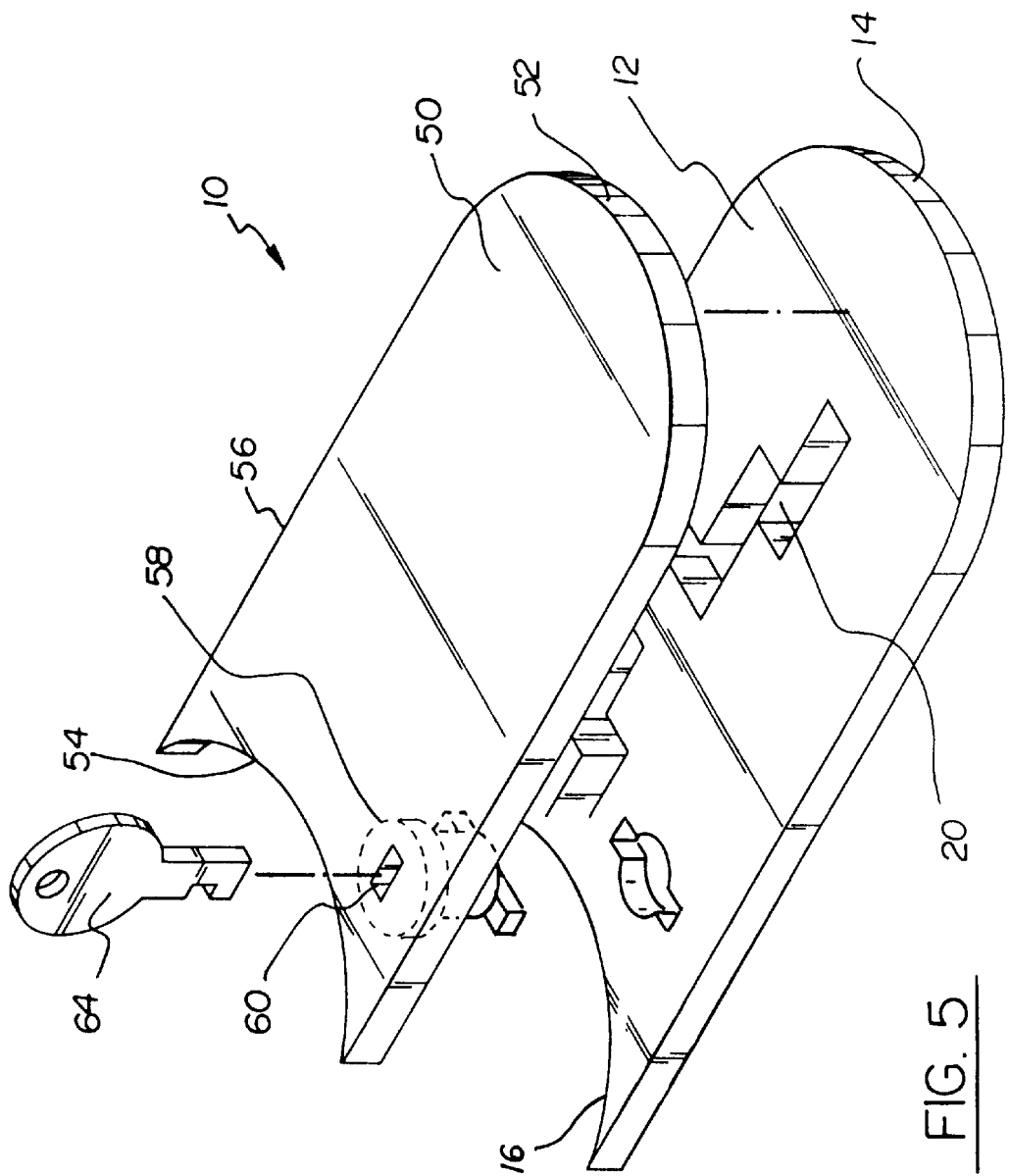
FIG. 5 is a perspective view of the preferred embodiment of the automatic transmission shift lock device constructed in accordance with the principles of the present invention.

With reference now to the drawings, and in particular to FIG. 1 thereof, a new and improved automatic transmission shift lock device embodying the principles and concepts of the present invention and generally designated by the reference numeral 10 will be described.

Specifically, it will be noted in the various Figures that the device relates to an automatic transmission shift lock device for locking a transmission shift in place to prevent tampering. In its broadest context, the device consists of a lower portion, a lock, an upper portion and a key. Such components are individually configured and correlated with respect to each other so as to attain the desired objective.

The device 10 includes a lower portion 12 having a generally elongated and planar configuration. The lower portion 12 has an outwardly curved forward edge 14, an inwardly curved rearward edge 16 and two long side edges 18. The lower portion 12 has a cut-out pattern 20 extending lengthwise through a central portion thereof with an opening 22 formed at the inwardly curved rearward edge 16. The cut-out pattern 20 corresponds to a shift pattern of a shift lever 24 of an automobile and is thus defined by a plurality of laterally offset linear slots. Note FIG. 1. The lower portion 12 is dimensioned for positioning within indented side portions 26 of a housing 28 for the shift lever 24 whereby the cut-out pattern 20 aligns with the shift pattern of the shift lever 24. This allows for the shift lever 24 to be shifted into the desire location of park, reverse, drive, etc. The pattern 20 of the lower portion will be customized to match the variety of shift patterns of different makes of automobiles. The lower portion 12 has a rectangular slot 30 with a circular central extent adjacent to the opening 22 in the cut-out pattern 20.

Associated with the lower portion 12 is an upper portion 50. The upper portion 50 has a generally elongated and planar configuration. The upper portion 50 has an outwardly curved forward edge 52, an inwardly curved rearward edge 54 and two long side edges 56. While the shape of the upper portion is identical to that of the lower portion, the size of the upper portion is proportionately smaller than the lower portion 12. As such, an end of the cut out pattern 20 is exposed by the upper portion when the upper portion is mounted on the lower portion. A lower surface of the upper portion 50 has a lock 42 mounted thereon. A key slot 60 extends through an upper surface of the upper portion 50 and into the lock.

It should be noted that the lock has a disk-shaped extent 40 for engaging the central extent of the rectangular slot of the lower portion. The disk-shaped extent preferably has a thickness equal to that of the upper portion. A rectangular extent 38 is rotatably mounted to a bottom of the disk-shaped extent and is further inserted through the rectangular slot when the upper portion is placed on the lower portion. The rectangular extent of the lock is further adapted for being rotated upon the insertion of a key 64 within the key slot and the subsequent rotation thereof. While the key and rectangular slot are shown to be rectangular in form in the Figures, it should be readily apparent that the slot may be enlarged, rounded or rotatable to allow rotation of the key therein. Further, the key may take any sort of shape or form for the purpose of allowing the rotation of the rectangular extent of the lock by authorized personnel only.

As such, the rectangular extent may be misaligned with the rectangular slot of the lower portion thus precluding the removal of the upper portion with respect to the lower portion. It should be noted that the foregoing procedure may be reversed for the purpose of allowing the removal of the upper portion with respect to the lower portion.

In use, the lower portion 12 is secured within the housing 28 of the shift lever 24. The automobile can be operated in a normal fashion with the lower portion 12 in place. The driver of the automobile may want to lock the gear in place, either while driving or before exiting the vehicle. The upper portion 50 is placed atop the lower portion 12 and pressed downwardly to a position flush with the lower portion 12. The key is then employed to lock the lower portion 12 and the upper portion 50 in place to prevent the shift lever 24 from being moved.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automatic transmission shift lock device for locking a transmission shift in place to prevent tampering comprising, in combination:

a lower portion having a generally elongated and planar configuration, the lower portion having an outwardly curved forward edge, an inwardly curved rearward edge and two long side edges, the lower portion having a cut-out pattern extending lengthwise through a central portion thereof with an opening formed at the inwardly curved rearward edge, the cut-out pattern, with longitudinal and transverse sections corresponding to a shift pattern of a shift lever of an automobile, the lower portion being dimensioned for positioning within indented side portions of a housing for the shift lever whereby the cut-out pattern aligning with the shift pattern of the shift lever, the lower portion having a rectangular slot with a circular central extent adjacent to the opening in the cut-out pattern; such slot and circular central extent being laterally offset from the cutout pattern; and an upper portion having a generally elongated and an entirely planar configuration, the upper portion having an outwardly curved forward edge with a common radius of curvature as the curved forward edge of the lower portion but with a lesser radius of curvature, an inwardly curved rearward edge with a common radius of curvature as the curved rearward edge of the lower portion but with a greater radius of curvature and two long side edges laterally inward of the two long side edges of the lower portion; a lower surface of the upper portion having a lock formed thereon, a key slot extending through an upper surface of the upper portion and into the lock, the upper portion dimensioned for engagement with the lower portion;

wherein the lock has a disk-shaped extent for engaging the central extent of the rectangular slot of the lower portion and a rectangular extent rotatably mounted to a bottom of the disk-shaped extent for being rotated upon the insertion of a key within the key slot and the subsequent rotation thereof, whereby the rectangular extent is misaligned with the rectangular slot of the lower portion thus precluding the removal of the upper portion with respect to the lower portion.

* * * * *